July 10, 1951  L. R. PISTOLES ET AL  2,559,830
BRAKE ADJUSTING MEANS
Filed Jan. 27, 1949  2 Sheets-Sheet 2
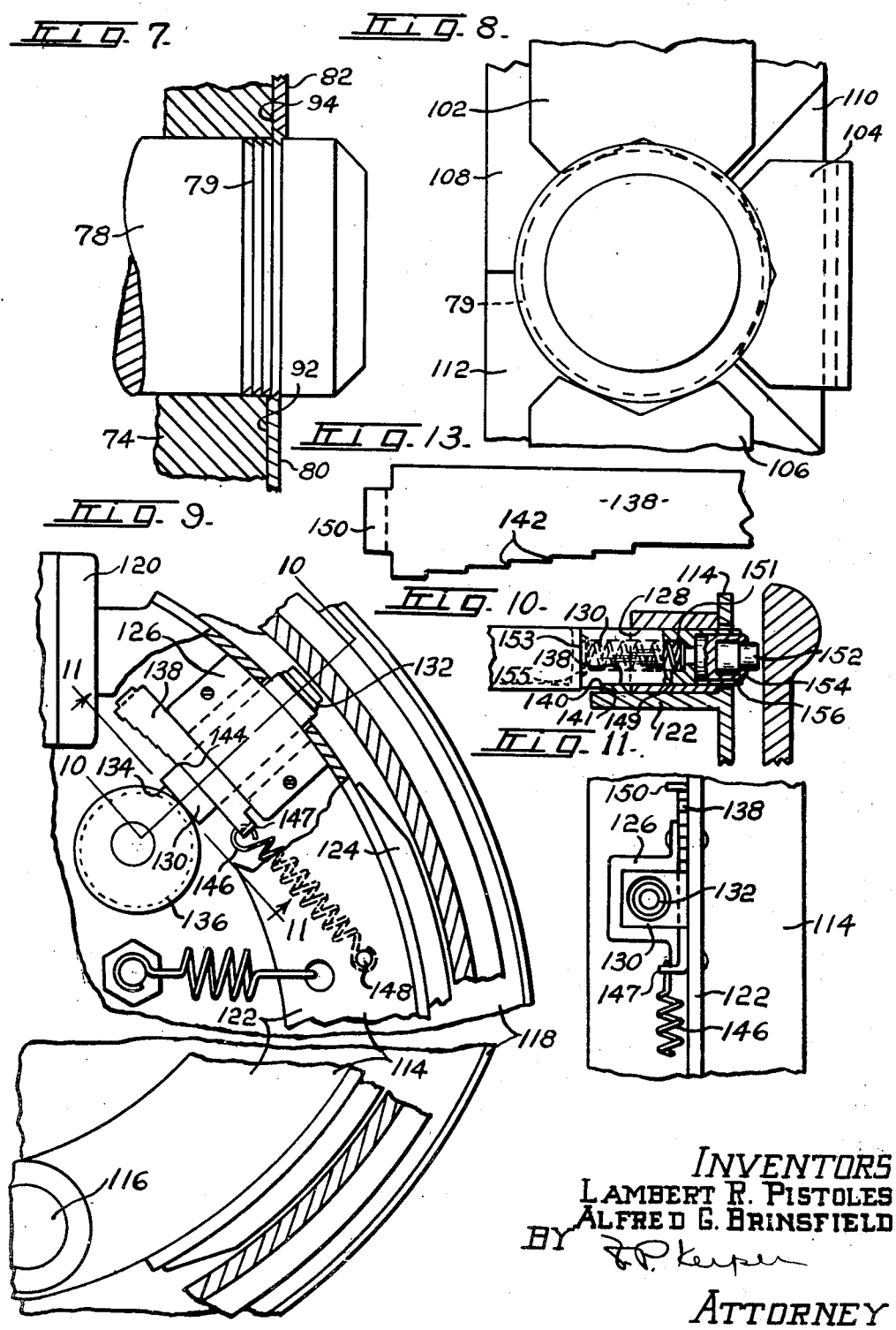
INVENTORS
LAMBERT R. PISTOLES
ALFRED G. BRINSFIELD
BY
ATTORNEY Patented July 10, 1951

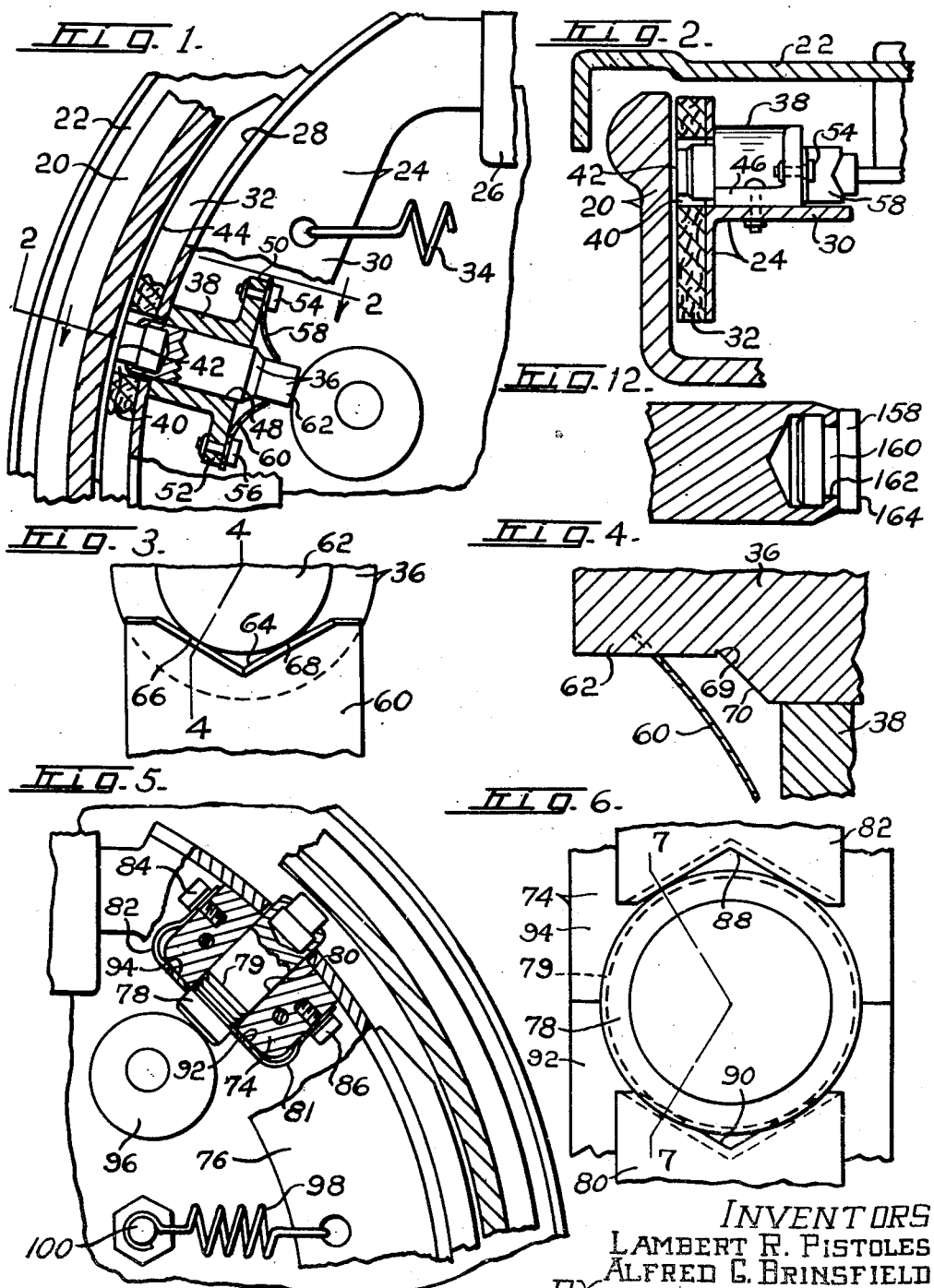

2,559,830

UNITED STATES PATENT OFFICE 2,559,830

BRAKE ADJUSTING MEANS

Lambert R. Pistoles and Alfred G. Brinsfield,
Wilmington, Del.

Application January 27, 1949, Serial No. 73,024

4 Claims. (Cl. 188—79.5)

This invention relates to brakes, and more particularly to brakes adapted for automotive vehicles, in which adjustment is automatically compensated for.

In brakes of the type described, the brake shoes are ordinarily of the internally expanding type, being expanded into internal engagement with a wheel mounted brake drum. In such brakes, it is essential to maintain a desirable clearance between shoes and drum, when disengaged, and that such clearance be maintained uniform and as small as practical in order that brake application may be effected with a minimum of actual engagement movement and a maximum engagement pressure, since such engagement is effected manually through a brake pedal whose travel and force applied are preferably maintained at a minimum. Since the brake converts kinetic energy into heat of friction, the drum is caused to expand, by an amount ordinarily sufficient to render it impractical to automatically maintain shoe clearance, without taking into account at any particular time the momentary heat expansion of the drum.

The present invention is directed to an automatic clearance adjuster which is so designed as to be directly responsive to brake drum expansion and provide adjustment for wear of the brake shoes only. An object of the invention is to provide an adjusting mechanism of the type referred to, which shall be rugged, composed of few parts, economical of manufacture and which will be positive in action over extended periods of service.

A further object of the invention is to provide an automatically adjustable brake in which a shoe carried element is adapted to directly contact the brake drum to determine wear extent, and to provide a clearance adjustment directly in correspondence to such wear.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, in which like reference characters indicate like parts:

Figure 1 is a fragmentary sectional view of a brake drum and shoe employing a shoe clearance adjuster;

Figure 2 is a section taken substantially on the line 2—2 of Figure 1;

Figure 3 is an enlarged end fragmentary view of the pin of Figures 1 and 2;

Figure 4 is an enlarged sectional view taken substantially on the line 4—4 of Figure 3;

Figure 5 is a fragmentary sectional view of a modified form of the invention;

Figure 6 is an enlarged end view of the modification of Figure 5;

Figure 7 is an enlarged sectional view taken substantially on the line 7—7 of Figure 6;

Figure 8 is a modified form of the invention, particularly that of Figures 5 to 7, inclusive;

Figure 9 is a fragmentary sectional view of a brake drum and shoe embodying a further modification of the invention;

Figure 10 is a section taken substantially on the line 10—10 of Figure 9;

Figure 11 is a radial end view of Figure 10, with the drum removed;

Figure 12 is a sectional view of a drum contact pin construction; and

Figure 13 is an enlarged fragmentary view of the step key of Figure 9.

Referring to Figures 1 to 4, inclusive, there is shown a brake drum 20, stationary backing plate 22, brake shoe 24 and actuating cylinder 26. The brake shoe is arcuate in form and has a lining supporting face 28 and central web 30. Suitable lining 32 is secured to the face as by riveting or otherwise, as is well understood in the art. The brake shoe is resiliently held in release position by a tension spring 34, and such release position is established by an adjustable eccentric pivotally mounted in the backing plate, bearing against a sliding round plug member 36 mounted in a guideway 38 carried by the shoe 24.

The face of the shoe and adjacent lining is provided with an aperture 40, through which the plug member extends, the end 42 of such plug member lying substantially flush with the wear face 44 of the lining 32. The guideway 38 is provided with attachment flanges 46 by which it is secured to the shoe web 30, with the plug bore 48 in alignment with the aperture 40. Upon oppositely extending integral ears 50 and 52 are mounted as by rivets 54 and 56 leaf springs 58 and 60, the same projecting toward and being deflected by a reduced diameter shank portion 62 of the plug 36. The ends of the leaf springs are V notched or of swallow-tail formation as at 64 to provide opposed double bearing edges such as 66 and 68 upon the shank portion 62. Such leaf springs permit the movement of the plug radially inward in the guide bore 48, but prevent opposite movement. The leaf springs bear against such pin with sufficient force to securely hold the pin in position with its end 42 substantially flush with the wear face 44 of the friction lining 32.

Whether the brake be of the floating two-shoe type connected by a link and in which the shoes anchor at the cylinder, or of the plain two-shoe type in which each shoe is individually anchored upon the backing plate diametrically across from the actuating cylinder (see for example, Figure 9), the plug member and eccentric, when once adjusted, will provide a fixed clearance between the brake shoe lining wear surface and the brake drum, when in released position with the drum normally cold. As the thickness of the lining wears down, the plug is driven radially inward an amount equivalent to the lining wear, which in turn resets the release position for the shoe with the same fixed clearance.

It will be understood that the brake shoes will gradually move apart, and that the actuating pistons in the brake cylinders will move outwardly so as to normally hold a greater quantity of brake fluid in the wheel cylinders, but such additional quantity is supplied by the master cylinder reservoir as will be well understood in the art.

The plug, as shown in Figure 4 has an annular notch 69 and a conical enlargement or shoulder 70. When the brake lining has worn sufficiently for the leaf springs to fall into the notch 69, no further adjustment can take place, the lining being too thin. Further, lining wear will be reflected in over-travel of the brake pedal, providing a warning that the brakes require relining.

In the form shown in Figures 5 and 6, there is provided a guide block 74 secured to the shoe web 76 adjacent one end of the lining. A drum engaging plug 78 is slidable in a radial circular aperture 80 in the guide block 74, and is provided with a plurality of uniformly axially spaced peripheral grooves 79 of saw tooth configuration. Slidable upon the transverse rear face of the guide block 74, are L-shaped leaf springs 81 and 82, each rigidly secured to the block side wall as by bolts 84 and 86. The free end of such spring leaves are V-notched and inclined as at 88 and 90 to complementarily engage and seat in the annular grooves 79. The rear face 92 of the guide block upon which leaf spring 81 slides, is spaced radially inward with respect to the rear face 94 upon which spring 82 slides, by an amount equal to half of the pitch or spacing between adjacent annular grooves 79. Thus, the plug may take successive positions one-half the pitch of said grooves, when driven back by drum contact resulting from the friction lining thickness being reduced by wear. The plug, as in the previous modification, is initially positioned to provide proper normal brake release clearance by a backing plate mounted adjustable eccentric 96, and the brake shoe is normally urged to such release position by a tension spring 98 extending to a stationary pin 100.

In Figure 8, the guide block is further varied to provide a cluster of three L-shaped springs of the type described in Figures 5 and 6. The free ends of springs 102, 104 and 106 ride upon transverse guide block surfaces 108, 110 and 112, which are radially spaced with respect to one another by a distance equal to ⅓ of the pitch between adjacent grooves 79 on the plug. The plug may therefore be moved in smaller increments or in response to smaller degrees of wear or decrease in thickness of the friction lining.

In the form shown in Figures 9, 10 and 11, each of the brake shoes 114 are anchored as at 116 to the backing plate 118, and actuated by opposed pistons in the cylinder 120. Secured to the web 122 of the shoe, beyond the extent of the lining 124, is a guide block 126 having a rectangular or square radially extending guideway 128. Within such guideway is a square plug 130, having a drum engaging end 132 and an abutment end 134 engaging an eccentric 136.

The guideway 128 is spaced from the face of the web 122 to provide clearance for a transversely sliding wedge key like detent or pawl 138, and the inside face of the plug 130 is provided with a shoulder 140 bearing thereagainst. The sliding detent (see Figure 13) is provided with small successive steps 142 providing uniform increments of increasing width, and the detent is constantly urged in a direction to engage one or another of such steps with the corner 144 of the shoulder 140, by a tension spring 146 connecting a bent end 147 of the detent and a web carried pin 148.

As the wear upon the friction lining drives the plug 130 radially inwardly, the clearance between the shoulder 140 and the end face 141 of the guide block increases permitting the detent to be drawn transversely of the plug, engaging a new step 142 with the corner 144. Thus, the plug is gradually driven radially inward as lining thickness decreases, where it is retained by the detent 138 and prevented from retrograde movement. Thus, the constant normal clearance between the friction face and drum is maintained during brake release. The detent is provided with an inturned end 150 to limit its movement after all safe adjustment has been effected.

The plug is bored as at 149 and provided with a compression spring 151, which bears against the flange 153 of the eccentric, so that the plug shoulder is always held in engagement with the stepped detent, except as the end of the plug engages the brake drum and is driven back thereby. The bore is bell mounted as at 155, so that the spring 151 will not become caught.

In the modifications, the plug has sliding fit, which may be snug enough to provide slight friction, if desired. The plug carries an end element 152 held in the plug by a shoulder 154 engaged by the plug wall 156 about the recess which may be upset and shrunk into rigid engagement. Since the wear element may be of special material adapted to rub against the brake drum without incurring damage thereto, and without appreciable wear to the element, it may be desirable to employ a construction such as is shown in Figure 12, wherein a minimum of material is used. Such element 158 is provided with an annular groove 160 to receive the upset rim 162 of the plug recess, whereby a broad drum engagement face 164 results.

While in the modification of Figure 1, the plug extends through an aperture in both the brake shoe and lining, such may extend through the shoe at a point spaced from the end of the lining as in Figures 5 and 9, eliminating any danger of the aperture and plug becoming filled with foreign matter likely to disturb the automatic functioning of the adjustment.

It will appear that the adjusting plug of either of the modifications may be used in conjunction with various brake shoe combinations, especially as regards anchoring systems, the invention being more particularly directed to the clearance adjustment and the maintenance of a fixed minimum lining to drum clearance.

While several modifications of the invention have been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. In a brake having automatic adjustment, an arcuate brake shoe having brake lining applied to the outer face thereof, a guide member secured to said shoe inwardly of said outer face having a substantially radial guide passage therethrough and a transverse inner end surface, a brake drum contact member projecting through the outer face of said shoe and slidable in said passage and having a shank extending radially inward of the guide member, means bearing on said guide member and a portion of said inwardly extending shank member, for allowing radially inward movement only of said shank, and a shoulder on said shank adapted to engage said bearing means after limited movement, to prevent further relative movement between said bearing means and shank.

2. In a brake shoe clearance adjuster, a brake shoe, lining thereon, having a braking surface, a guide block mounted on said shoe having an aperture therein substantially normal to said surface, plug means slidable in said aperture having an end surface adapted to be positioned substantially flush with said surface, and a shank projecting inwardly from said block, resilient leaf springs secured to said block and angularly engaging said shank, and a shoulder on said shank adapted to engage said springs after limited radial inward travel.

3. In a brake, a brake drum, a backing plate, a brake shoe having friction lining thereon, actuating means therefor, an adjustable clearance stop mounted on said backing plate, a shoe carried abutment having a smooth shank portion adapted to engage said stop, and projecting through said lining to a point flush therewith, means affixed to said shoe for guiding the movement of said abutment, resilient leaf springs angularly engaging said shank portion to limit movement thereof radially inward of the shoe in response to lining wear upon engagement of said shoe with the drum, and a shoulder on said shank adapted to engage said springs after a predetermined lining wear.

4. In a brake, a brake drum, a backing plate, a brake shoe having friction lining thereon, actuating means therefor, an adjustable clearance stop mounted on said backing plate, a shoe carried abutment having a smooth shank portion adapted to engage said stop, and projecting through said lining to a point flush therewith, means affixed to said shoe for guiding the movement of said abutment, and resilient leaf springs having V ends angularly engaging said shank portion to limit movement thereof radially inward of the shoe in response to lining wear upon engagement of said shoe with the drum, and shoulder means on said shank for engaging said springs after a predetermined lining wear whereby to limit the range of adjustment.

LAMBERT R. PISTOLES.
ALFRED G. BRINSFIELD.

REFERENCES CITED

The following references are of record in the file of this patent:

UNITED STATES PATENTS

| Number | Name | Date |
|---|---|---|
| 2,168,646 | Goepfrich | Aug. 8, 1939 |
| 2,189,226 | Ryan | Feb. 6, 1940 |
| 2,212,322 | Lane | Aug. 20, 1940 |
| 2,380,795 | Schnell | July 31, 1945 |
| 2,472,697 | DuBois | June 7, 1949 |